US012576722B2

(12) United States Patent
Prüssmeier et al.

(10) Patent No.: US 12,576,722 B2
(45) Date of Patent: Mar. 17, 2026

(54) ENERGY TRANSMISSION IN A LINEAR TRANSPORT SYSTEM

(71) Applicant: Beckhoff Automation GmbH, Verl (DE)

(72) Inventors: Uwe Prüssmeier, Lemgo (DE); Andreas Brinker, Bakum (DE); Irina Stockem, Gütersloh (DE); Thomas Vorbohle, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 889 days.

(21) Appl. No.: 17/886,005

(22) Filed: Aug. 11, 2022

(65) Prior Publication Data

US 2022/0388401 A1      Dec. 8, 2022

Related U.S. Application Data

(63) Continuation of application No. PCT/EP2021/056825, filed on Mar. 17, 2021.

(30) Foreign Application Priority Data

Mar. 20, 2020     (DE) ..................... 10 2020 107 782.3

(51) Int. Cl.
*B60L 5/00*          (2006.01)
*B60L 13/03*         (2006.01)
          (Continued)

(52) U.S. Cl.
CPC .............. *B60L 5/005* (2013.01); *B60L 13/03* (2013.01); *B60L 53/12* (2019.02); *B60L 53/305* (2019.02); *B60L 2200/26* (2013.01)

(58) Field of Classification Search
CPC ........ B60L 5/005; B60L 53/12; B60L 53/305; B60L 13/03; B60L 2200/26
See application file for complete search history.

(56) References Cited

U.S. PATENT DOCUMENTS 6,499,701 B1 *  12/2002  Thornton ................ B60L 5/005
                                                      246/194
9,079,724 B2 *   7/2015  van de Loecht ..... B65G 47/841
                              (Continued)

FOREIGN PATENT DOCUMENTS

CN          105966259 B   * 12/2017   .............. H02J 7/025
CN          110536811 A     12/2019
                              (Continued)

OTHER PUBLICATIONS

Office Action dated Mar. 22, 2025 in connection with Chinese patent application No. 202180022031.5, 7 pages including English translation.

(Continued)

*Primary Examiner* — Jason C Smith
(74) *Attorney, Agent, or Firm* — Dorsey & Whitney LLP

(57)           ABSTRACT

A method is provided for transferring energy from a stationary unit to a movable unit of a linear transport system. The system includes a guide rail for guiding the movable unit, a plurality of stationary units, a controller, and a linear motor for driving the movable unit along the guide rail. The linear motor includes a stator and a rotor. The stator comprises the stationary units, each having one or more drive coils. The rotor is arranged on the movable unit, and has one or a more magnets. In addition, the stationary units each have one or more energy-transmitting coils, and the movable unit has at least one energy-receiving coil. The controller determines position data for the energy-receiving coil, selects at least one energy-transmitting coil based on the position data, and outputs a control signal to the stationary unit, with identification information for identifying the energy-transmitting coil.

18 Claims, 8 Drawing Sheets

(51) Int. Cl.
B60L 53/12 (2019.01)
B60L 53/30 (2019.01)

(56) References Cited

U.S. PATENT DOCUMENTS

| | | | | |
|---|---|---|---|---|
| 9,188,421 B2 * | 11/2015 | Prüssmeier | .......... | G01D 5/2046 |
| 9,806,647 B2 * | 10/2017 | Prüssmeier | .............. | H02P 6/12 |
| 11,046,194 B2 | 6/2021 | Grassl et al. | | |
| 12,040,634 B2 * | 7/2024 | Prüssmeier | ............. | B60L 5/005 |
| 2011/0031047 A1 * | 2/2011 | Tarr | ........................ | B60L 50/40 |
| | | | | 191/10 |
| 2018/0062535 A1 | 3/2018 | Kaulmann et al. | | |
| 2018/0319282 A1 | 11/2018 | Haenschke et al. | | |
| 2021/0046826 A1 | 2/2021 | Prüssmeier et al. | | |
| 2021/0159834 A1 * | 5/2021 | Schönke | ................ | H02K 16/02 |
| 2022/0388401 A1 * | 12/2022 | Prüssmeier | ............. | B60L 53/12 |

FOREIGN PATENT DOCUMENTS

| | | | | | | |
|---|---|---|---|---|---|---|
| CN | 111114351 A | * | 5/2020 | ............. | H02J 50/12 |
| CN | 110962633 B | * | 3/2021 | ............. | B60L 53/20 |
| CN | 113103928 A | * | 7/2021 | ............. | B60L 53/12 |
| CN | 115214394 A | * | 10/2022 | ............. | B60L 53/60 |
| DE | 102015102236 A1 | | 8/2016 | | |
| DE | 102018111715 A1 | * | 11/2019 | ............. | B60L 5/005 |
| DE | 102018118814 A1 | | 2/2020 | | |
| EP | 2661606 B1 | | 12/2014 | | |
| EP | 3403867 A1 | * | 11/2018 | ............... | B60L 7/10 |
| WO | 2019219834 A1 | | 11/2019 | | |

OTHER PUBLICATIONS

International Search Report and Written Opinion dated Jun. 21, 2021 in connection with PCT/EP2021/056825, 17 pages including translation.
International Preliminary Report on Patentability dated Jul. 8, 2022 in connection with PCT/EP2021/056825, 21 pages Including translation.
International Standard ISO/IEC 14443-1, Fourth Edition, Apr. 2018, 18 pages.
English translation of European patent publication EP3403867A1, 28 pages.
English translation of German patent publication DE102018111715A1, 40 pages.

* cited by examiner

ENERGY TRANSMISSION IN A LINEAR TRANSPORT SYSTEM

CROSS-REFERENCE TO RELATED APPLICATIONS

This application is a continuation of International Patent Application No. PCT/EP2021/056825, filed Mar. 17, 2021, entitled ENERGY TRANSMISSION IN A LINEAR TRANSPORT SYSTEM, which claims priority to German patent application DE 10 2020 107 782.3, filed Mar. 20, 2020, entitled ENERGIEÜBERTRAGUNG IN EINEM LINEAREN TRANSPORTSYSTEM, each of which is incorporated by reference herein, in the entirety and for all purposes.

FIELD

The present invention relates to a transfer of energy in a linear transport system. In particular, the invention comprises a method for transferring energy in a linear transport system, a controller and a computer program for executing the method, a machine-readable storage medium containing a computer program, a stationary unit of a linear transport system, and the linear transport system.

The prior art discloses linear transport systems in which a movable unit may be moved along a guide rail and which have a linear motor for driving the movable unit, the linear motor comprising a stator and a rotor. The stator may in this context comprise at least one motor module arranged stationary along the guide rail and having one or a plurality of drive coils, while the movable unit is arranged on the carriage and may comprise one or a plurality of magnets. By energizing the drive coils, a force may be generated on the magnets of the movable unit in such a way that the movable unit moves along the guide rail. It may further be provided that the movable unit or the carriage comprises a tool, wherein energy must be transferred from the stationary unit to the movable unit to operate the tool, and data may be transferred both from the stationary unit to the movable unit and from the movable unit to the stationary unit. German patent application DE 10 2018 111 715 A1 dated 16 May 2018 discloses such a linear transport system providing an energy transfer between a stationary coil module, i.e. a stationary unit, and a movable carriage, i.e. a movable unit. For this purpose, energy-transmitting coils as well as energy-receiving coils for energy transmission and first data coils and second data coils, respectively, for a data transmission are provided.

SUMMARY

The invention provides an improved method for transferring energy from a stationary unit to a movable unit of a linear transport system. The invention further provides a controller capable of controlling the method, a computer program for carrying out the method, and a machine-readable storage medium for the computer program. The invention further provides a stationary unit of a linear transport system configured to perform energy transfer according to the method of the invention, and provides a linear transport system in which such an energy transfer is possible.

According to a first aspect, a linear transport system comprises a guide rail for guiding a movable unit, a plurality of stationary units, a controller, and a linear motor for driving the movable unit along the guide rail. The linear motor comprises a stator and a rotor, the stator comprising the stationary units. The stationary units each have one or a plurality of drive coils. The rotor is arranged on the movable unit and comprises one or a plurality of magnets. If the drive coils of the stationary units are energized, a magnetic force may thereby be exerted on the magnets of the rotor and thus the rotor and thus the movable unit may be moved along the guide rail. The stationary units each comprise one or a plurality of energy-transmitting coils, and the movable unit comprises at least one energy-receiving coil.

According to a second aspect, in a method for transferring energy from a stationary unit of the linear transport system to a movable unit of the linear transport system, the following steps are performed by the controller: First, position data of the energy-receiving coil of the movable unit are obtained. Then, based on the position data of the energy-receiving coil, at least one energy-transmitting coil within the linear transport system is selected. Subsequently, a control signal is output to the stationary unit comprising the at least one energy-transmitting coil, the control signal comprising identification information by which the at least one energy-transmitting coil may be identified.

A plurality of stationary units may be arranged within the linear transport system, each of which may have one or a plurality of energy-transmitting coils. By selecting one of the energy-transmitting coils within the linear transport system on the basis of the position data of the movable unit, it may be achieved that only that energy-transmitting coil or those energy-transmitting coils is or are energized via which an efficient energy transfer to the movable unit is currently possible. As a rule, this will be the energy-transmitting coils closest to the movable unit. Other energy-transmitting coils located at a distance from the movable unit, which are therefore not required for energy transfer, may be energized to a lesser extent or not at all, so that an overall energy saving is possible.

In this context, it may be provided to adjust an energy quantity and/or a power and/or a current intensity of a current flow of the selected energy-transmitting coil, wherein the energy quantity and/or the power and/or the current intensity is adjusted during an initialization.

It may be provided that the execution of the method is controlled by a central controller of the linear transport system, since within this central controller the position data of the movable unit are acquired anyway in order to control a current supply to the drive coils on the basis of the position data. In particular, this may be done if the linear transport system has more than one movable unit on the guide rail. The controller then outputs the control signal to the stationary unit to which the energy-transmitting coil selected to carry out the energy transfer is assigned. The corresponding stationary unit may be arranged to receive the control signal and select the energy-transmitting coil that may be identified based on the identification information. Furthermore, the stationary unit may optionally be arranged to energize the selected energy-transmitting coil based on the energy quantity information.

According to a third aspect, a controller is set up to perform the method according to the invention.

According to a fourth aspect, a computer program comprising program code which, when executed on a computer, causes the computer to carry out the method according to the invention.

According to a fifth aspect, a machine-readable storage medium comprising the computer program.

According to a sixth aspect, a stationary unit of a linear transport system comprises a stator with one or a plurality of drive coils for driving a rotor. The stationary unit further comprises at least one energy-transmitting coil and is set up to receive a control signal. In this regard, the control signal comprises identification information identifying at least one energy-transmitting coil and energy quantity information comprising the amount of energy to be transmitted. The stationary unit is set up to select one or a plurality of energy-transmitting coils based on the identification information, and to set an energy transfer of the one or a plurality of energy-transmitting coils based on the energy quantity information.

The linear transport system may comprise the controller according to the invention, the stationary unit according to the invention, and at least one movable unit with at least one rotor and with an energy-receiving coil.

EXAMPLES

In an embodiment of the method, the control signal comprises an energy quantity information comprising the energy quantity to be transmitted. This allows for controlling or regulating the amount of energy to be transmitted.

In an embodiment of the method, the energy quantity information comprises an amplitude and/or a frequency of an alternating voltage or alternating current. If the energy-transmitting coil is energized with an AC voltage or an AC current of a higher amplitude, more energy may be transmitted. The same applies if the energy-transmitting coil is energized with an AC voltage or an AC current of a higher frequency. The energy-transmitting coils that are not currently to be used for energy transmission may then e.g. be energized with an amplitude close to zero or zero. The amplitude and/or frequency of an AC voltage or current may be used to easily set or control the required energy quantities.

If a plurality of movable units are provided, different energy-transmitting coils may also be supplied with different alternating voltages or alternating currents in order to transmit different amounts of energy. The amplitudes and/or frequencies of the different alternating voltages or currents may thereby be provided to be set differently.

In an embodiment of the method, the amount of energy comprises a load energy quantity at a first point in time and an idle energy quantity at a second point in time. The load energy quantity is adapted in each case to the operation of a tool arranged on the movable unit. The idle energy quantity is at most sufficient for maintaining an energy supply of a communication unit of the movable unit. It may be provided that the movable unit comprises a tool that requires energy for operation. If it becomes clear via the communication unit that the tool is to carry out an action and for this reason the load energy quantity is necessary, the energy-transmitting coil may be energized in such a way that the load energy quantity is transmitted. If the tool is not to carry out an action, the idle energy quantity may be transmitted, which is sufficient to maintain a communication between the movable unit and the stationary unit, e.g. by radio transmission, which is, however, not sufficient to make the tool additionally perform an action. In this way, further energy saving may be made possible if the energy transmission to the movable unit is controlled in such a way that the load energy quantity is transmitted only when a corresponding action of the tool requiring the corresponding energy quantity is currently being carried out.

In an embodiment of the method, the amount of idle energy is zero. In this case, no energy at all is transferred between the stationary unit and the movable unit at the second point in time, which also means that a communication link is no longer available. This may e.g. be the case if the movable unit together with the tool is located in an area in which an action of the tool would not make sense at all.

In an embodiment of the method, the position data are determined on the basis of a measurement of at least one position sensor and/or is determined on the basis of a current supply to the linear motor. By energizing the linear motor, a movement of a movable unit along the guide rail may be tracked to a certain extent, since certain energizations lead to a certain movement of the movable unit. This may already be sufficient to determine the position data on the basis of which the energy-transmitting coil is to be selected with sufficient accuracy. In this context, it may be provided to take the current flow from control data and/or to measure it with a sensor. Alternatively or additionally, however, position data may also be determined by a measurement of at least one position sensor, in which case a magnetic field of a position magnet arranged on the movable unit is typically determined by magnetic field sensors of the stationary unit. The position magnet may be part of the magnets of the rotor.

In an embodiment, ii the event that the position data indicates that the amount of energy is to be transmitted by a plurality of energy-transmitting coils, the energy-transmitting coils being arranged in series along the guide rail, the amount of energy information is adjusted based on an area of a space between the energy-transmitting coils and an area of the energy-receiving coil. The adjustment based on the area may also be based on dimensions of the energy-transmitting coil and the intermediate space. An intermediate space is provided between the energy-transmitting coils, e.g. between two energy-transmitting coils of one stationary unit or one energy-transmitting coil of each of two stationary units, which space is small in area with respect to the energy-transmitting coils. This may e.g. be achieved by the intermediate space having a smaller width than a length of the energy-receiving coil, in each case in the direction of movement of the movable unit. If the movable unit with the energy-receiving coil now moves across this intermediate space, no energy may be transmitted in the area of the intermediate space. If the area of the intermediate space is e.g. 10% of the area of the energy-receiving coil, provision may be made to increase the energy transmitted by energization of the energy-transmitting coils by 10% in order to compensate for the area of the intermediate space accordingly and thus provide continuous energy transmission when the movable unit moves along the guide rail from one energy-transmitting coil to another energy-transmitting coil. The current may e.g. be increased in amplitude and/or frequency and the increase need not necessarily be proportional to the overlapping area. Another functional relationship may also be selected, as well, via which a constant power (or over time a constant energy) may be transmitted.

In an embodiment, phase information is output, wherein the phase information is used to adjust a phase of the alternating current of the plurality of energy-transmitting coils, thereby causing the energy-transmitting coils to be energized in phase.

In an embodiment of the method, an actual energy quantity signal of the movable unit is evaluated and the energy quantity is controlled on the basis of the actual energy quantity signal. The actual energy quantity signal may be such a signal transmitted from the movable unit to the stationary unit or to the controller, which comprises whether the currently performed action of the tool of the movable unit requires a higher or lower energy quantity. The energy transmitted by the energy-transmitting coil may be adjusted via a control loop. The control loop may be arranged within the stationary unit, in which case an energy quantity controller of the stationary unit uses the energy quantity information and the actual energy quantity signal to perform a control of the energy provided via the energy-transmitting coil. Alternatively, the control loop may be configured such that the actual energy quantity signal is transmitted from the stationary unit to the controller or from the movable unit directly to the controller. In this case, the control loop may involve adjusting the energy quantity information of the control signal accordingly by the controller. The energy quantity information may comprise a transmitted energy quantity, an actual current value or a transmitted power.

In an embodiment, the stationary unit has a control loop by which an actual energy quantity signal is evaluated and used to adjust the energy transfer.

In an embodiment, the stationary unit further comprises a guide rail and one or a plurality of drive coils for driving a movable unit.

A linear transport system comprises a controller according to the invention, at least one stationary unit according to the invention, and at least one movable unit. The movable unit comprises an energy-receiving coil. A rotor is arranged at the movable unit and comprises one or a plurality of magnets. The stator and the rotor form a linear drive. In such a linear transport system, a predetermined amount of energy may be selectively transferred to the movable unit while saving energy by correspondingly not energizing those energy-transmitting coils that could only inefficiently transfer energy to the movable unit at the current time.

BRIEF DESCRIPTION OF THE DRAWINGS

The present invention will be discussed in more detail below by embodiment examples and with reference to figures. Here, in a schematic illustration in each case.

Figure 1:
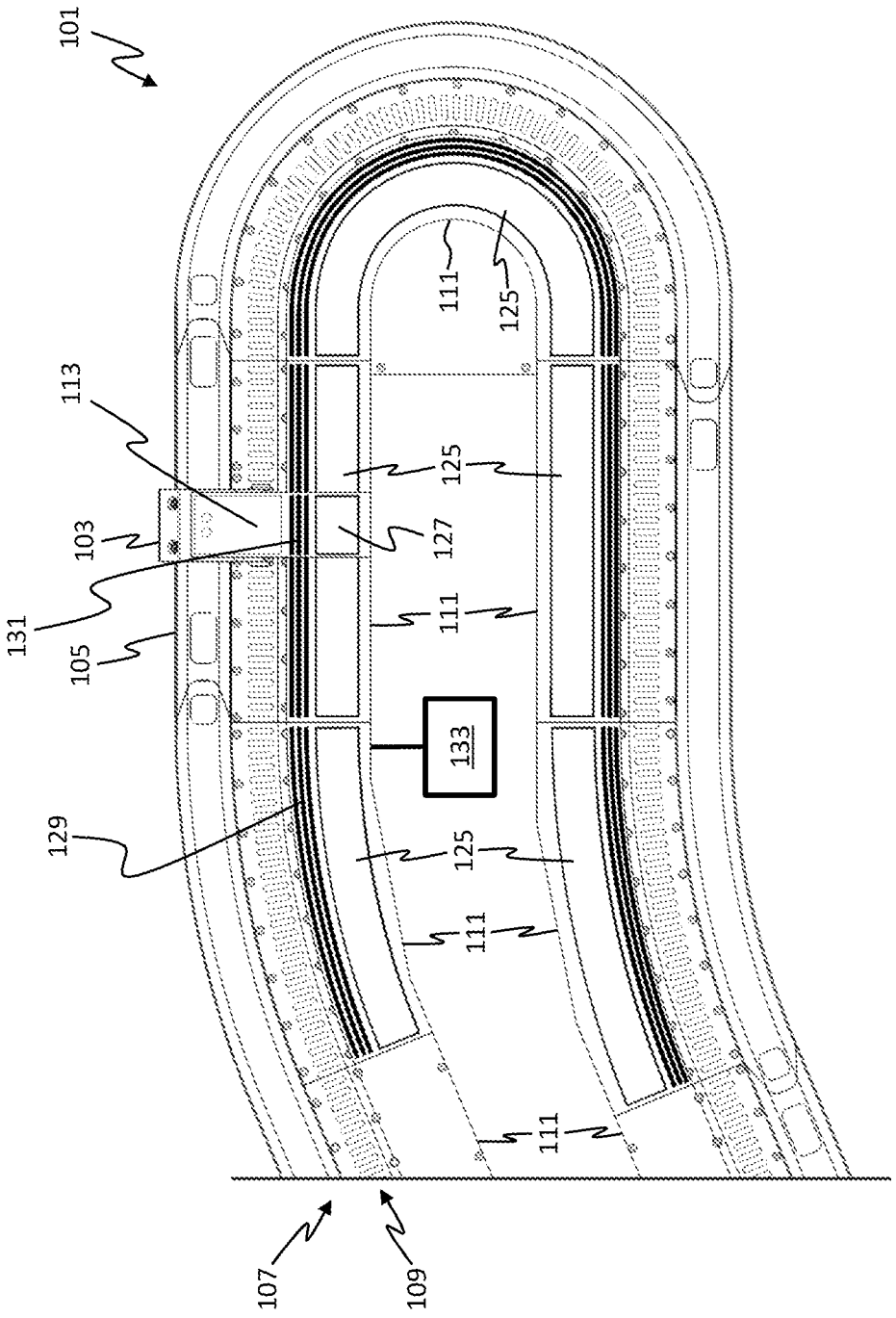
FIG. 1 shows a linear transport system.

In the following, the same reference numerals may be used for the same features. Furthermore, for the sake of clarity, it may be provided that not all elements are shown in each figure. Furthermore, for the sake of clarity, it may be provided that not every element has its own reference numeral in every drawing.

FIG. 1 shows a linear transport system 101. The linear transport system 101 comprises a movable unit 103 guided by a guide rail 105. The movable unit 103 comprises track rollers not shown here and a rotor 113 with magnets. The rollers of the movable unit 103 may roll on track surfaces of the guide rail 105.

The linear transport system 101 further comprises a linear motor 107, the linear motor 107 comprising a stator 109. The stator 109 of the linear motor 107 is arranged in the stationary units 111, each of which has a plurality of drive coils for this purpose. In this regard, the stationary units 111 in FIG. 1 are partially configured differently, wherein individual stationary units 111 may be straight or curved. The linear motor 107 further comprises the armature 113 which is arranged on the movable unit 103 and comprises one or a plurality of magnets. The stationary units 111 each comprise an energy-transmitting coil 125. The movable unit 103 comprises an energy-receiving coil 127. In an alternative embodiment not shown in FIG. 1, a stationary unit 111 may also comprise multiple energy-transmitting coils 125.

The stationary units 111 further comprise optional stationary antennas 129. The movable unit 103 comprises an optional movable antenna 131. The movable antenna 131 is fixed to the movable unit 103, but may move along the guide rail 105 together with the movable unit 103. With the aid of the stationary antennas 129 and the movable antenna 131, data may be exchanged between the stationary units 111 and the movable unit 103. Alternatively, however, such data transmission may e.g. also be embodied by a wireless LAN or a Bluetooth or an infrared connection or a 5G connection or according to the DECT standard or as optical transmission. In this case, the stationary unit 111 does not comprise the stationary antenna 129, and the movable unit 103 does not comprise the movable antenna 131, as is respectively shown in FIG. 1. However, other antennas may be arranged on the movable unit 103. The stationary antennas and/or the movable antennas may be arranged completely independently of the embodiment shown in FIG. 1.

The linear transport system 101 further comprises a controller 133 that is directly connected to either one of the stationary units 111 or to all of the stationary units 111. Shown in FIG. 1 is a connection to one of the stationary units 111, in which case it may be provided that the stationary units 111 comprise a communication bus via which signals from the controller 133 may be exchanged between the stationary units 111. Furthermore, other communication units not shown in FIG. 1 may be arranged between the controller 133 and the stationary unit or units.

Figure 2:
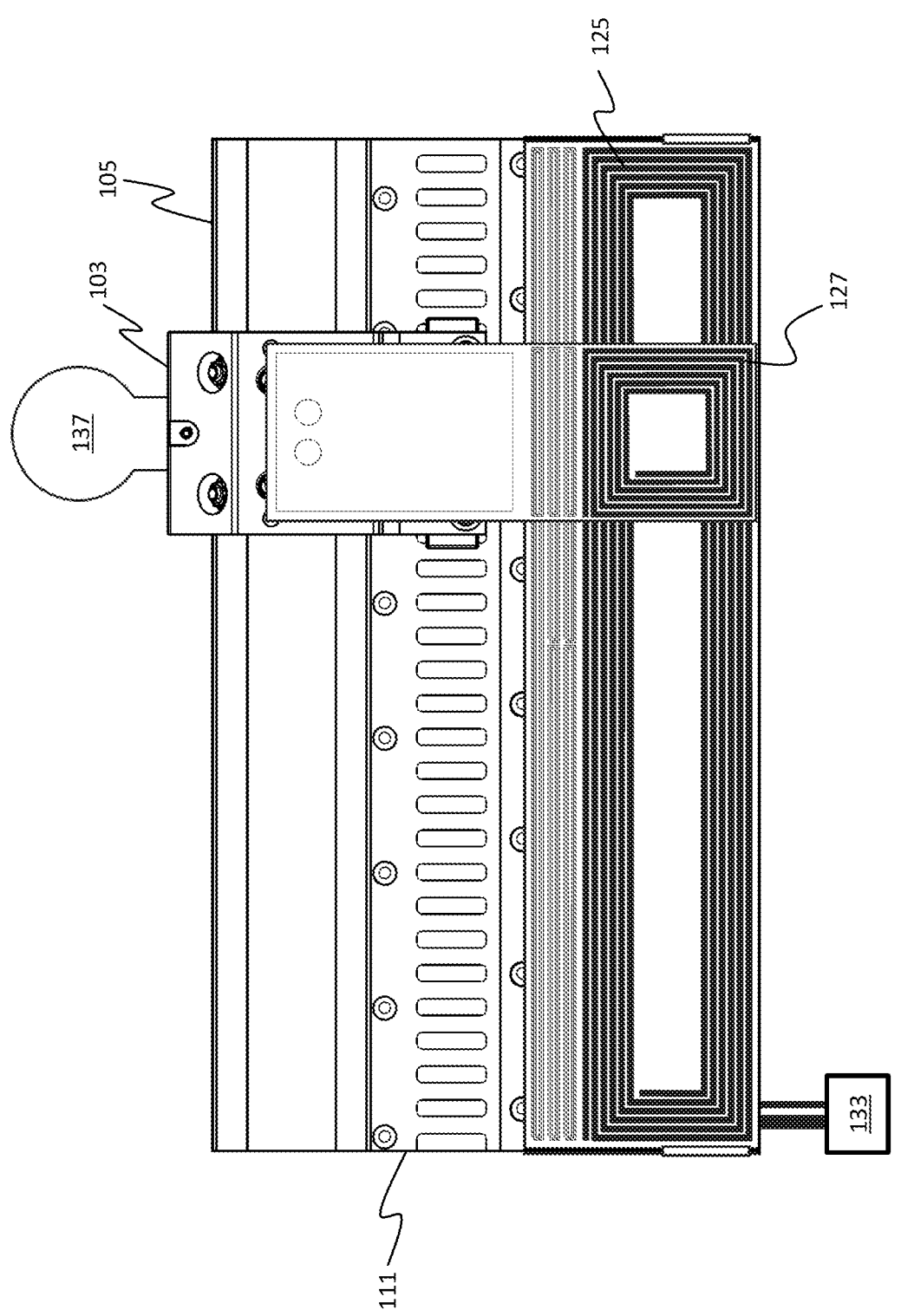
FIG. 2 shows a section of the linear transport system of FIG. 1.

FIG. 2 shows a more detailed view of a stationary unit 111 on which a movable unit 103 is arranged. The movable unit 103 comprises a tool 137, which may e.g. be embodied as an electric tool, for example. In order to be able to operate the tool 137, an energy transfer from the stationary unit 111 to the movable unit 103 is necessary. This may be done via the energy-transmitting coil 125 of the stationary unit 111 and the energy-receiving coil 127 of the movable unit 103. When the energy-transmitting coil 125 is energized, e.g. with an alternating current, a corresponding magnetic field is generated, which induces a voltage in the energy-receiving coil 127. This induced voltage may then be used to provide power to the tool 137 of the movable unit 103.

Figure 3:
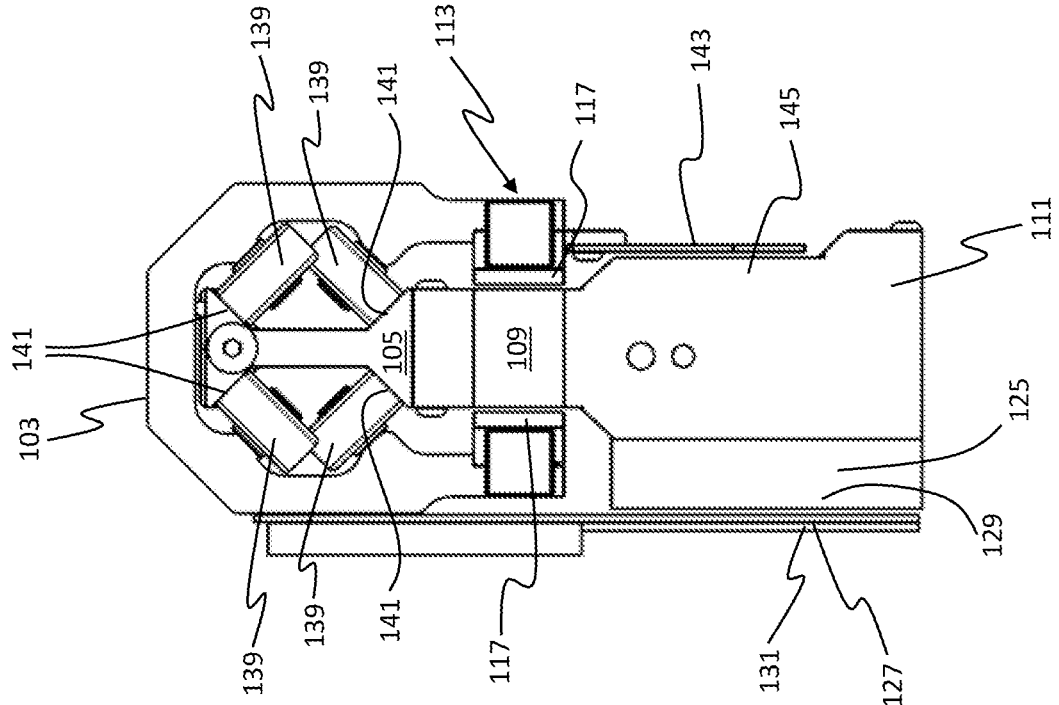
FIG. 3 shows a lateral top view of the section of the linear transport system of FIG. 2.

FIG. 3 shows a lateral top view of a stationary unit 111 including a guide rail 105, on which a movable unit 103 is arranged. The movable unit 103 may also be guided using alternative embodiments not shown. Track rollers 139 of the movable unit 103 may roll on track surfaces 141 of the guide rail 105, allowing substantially one-dimensional movement of the movable unit 103 along the guide rail 105. Also shown in FIG. 3 are magnets 117 of the movable unit 103, which form the rotor 113 of the linear motor 107. Additionally shown is the stator 109 of the linear motor 107, which is formed from stator teeth and drive coils not shown. Below the magnets 117 and the stator 109, the movable unit 103 comprises a position detection element 143. In this region, the stationary unit 111 comprises a position sensor 145. The position sensor 145 may, for example, measure an induction behavior of a coil changed by a metal piece embedded in the position detection element 143. For this purpose, the position sensor 145 may e.g. comprise a current-carrying coil in which, due to a change in inductance, a passing of the position detection element 143 leads to a change in the current in the coil, and thus the position of the position detection element 143 and thus of the movable unit 103 may be detected. However, the position sensor 145 may of course be configured differently, e.g. with an energizing coil and receiving coil, respectively, via which an inductance of the metal piece embedded in the position detection element 143 is measured, as well. Furthermore, magnets 117 embedded in the position detection element 143 or a light barrier evaluation for position determination are e.g. possible.

A power supply to movable antenna 131 as well as tool 137 may be provided by the energy-transmitting coil 125 and energy-receiving coil 127, respectively, shown in FIGS. 1 to 3. It may be provided that the movable unit 103 comprises an energy storage, wherein the energy storage may be embodied as a capacitor, accumulator, supercap or supercapacitor, superconducting magnetic energy storage or as a flywheel. In this way, energy may e.g. be stored to transfer a larger amount of energy in advance for a longer period of time for actions of the tool 137 that require more power in the short term than may be provided by the energy-transmitting coil 125. In addition, energy may be stored in this way in order to bridge larger areas without energy transmission and still be able to maintain communication therein with the aid of the movable antenna 131 or in order to carry out an action of the tool 137 therein.

In a method for transferring energy from the stationary unit 111 to the movable unit 103 of the linear transport system 101, the following steps may be carried out by the controller 133: at first, position data of the movable unit 103 are determined. These position data may include a position of the movable unit 103 relative to the stationary units 111 of the linear transport system 101. In this regard, it may be provided that the position data is determined by the position sensor 145. Subsequently, at least one of the energy-transmitting coils 125 is selected. The selection is made on the basis of the position data. It may be provided in this context to select the energy-transmitting coil 125 in such a way that the selected energy-transmitting coil 125 is at least partially, in particular completely, opposite the energy-receiving coil 127. The selection may thereby comprise both the selection of the stationary unit 111 and, if the stationary unit 111 comprises a plurality of energy-transmitting coils 125, the selection of the energy-transmitting coil 125 within the stationary unit 111. It may be provided that, in the case of stationary units 111 having a plurality of individually controllable energy-transmitting coils 125, a plurality of the energy-transmitting coils 125 are also selected for energy transfer. Furthermore, it may be provided that when the movable unit 103 is currently located at a junction between two energy-transmitting coils 125, both energy-transmitting coils 125 may be selected.

The selection of the energy-transmitting coils 125 may also be embodied to either ensure good transmission or to selectively select poorer energy transmission, thereby controlling the energy to be transmitted.

After selecting the at least one energy-transmitting coil 125 within the linear transport system 101 based on the position data, a control signal is output from the controller 133, which outputs identification information. With the aid of the identification information, the at least one energy-transmitting coil 125 may be identified.

In an embodiment, the control signal comprises energy quantity information. The energy quantity information includes the amount of energy to be transmitted. This control signal is output from the controller 133 to the corresponding stationary unit 111. Within the stationary unit 111, the energy-transmitting coil 125 may then be energized such that the amount of energy defined by the energy quantity information is transmitted to the movable unit 103. The amount of energy to be transferred may comprise by the power required.

It may be provided that the energy quantity information includes an amplitude and/or a frequency of an AC voltage or an AC current. Both by amplitude and by frequency of the AC voltage/current, an energy and/or power transmitted via the energy-transmitting coil 125 to the energy-receiving coil 127 may be adjusted.

It may be provided that the stationary unit 111 selects the frequency and/or the amplitude independently, e.g. from a corresponding table. In this way, the amount of energy to be transmitted may be transmitted optimally. For this purpose, it may possibly be useful to communicate the position data and optionally additionally a dimension of the movable unit 103 to the stationary unit 111.

In an embodiment, the amount of energy comprises a load energy amount at a first point in time and an idle energy amount at a second point in time. The load energy amount is sufficient to operate the tool 137 disposed on the movable unit 103. The idle energy amount is maximally sufficient to maintain a power supply to a communication unit of the movable unit 103. This means that when the movable unit 103 is at a point where an action of the tool 137 is required, a larger amount of energy, namely the amount of energy required to operate the tool 137, is transmitted. At other points, it may be provided to transmit only an amount of energy that is maximally sufficient to maintain communication through the stationary antennas 129 and the movable antenna 131.

In an embodiment, the amount of idle energy is zero. This is the case when there are also positions within the linear transport system 101 where there is to be no communication at all between the stationary unit 111 and the movable unit 103.

In an embodiment, the position data are determined based on a measurement of at least one position sensor 145. In a further embodiment, the position data are determined based on a current applied to the linear motor 107. Either possibility may be sufficient to determine a position of the movable unit 103 relative to the stationary units 111 with sufficient accuracy to select the energy-transmitting coil 125. Another way of determining the position data is to use a magnetic field sensor, e.g. a (3D) Hall sensor, to measure a position of one or a plurality of magnets 117 of the movable unit.

In addition to the transfer of energy from the energy-transmitting coils 125 to the energy-receiving coils 127, it may also be provided in certain situations to transfer energy in the opposite direction. This may e.g. be done when more energy than required has been transferred to the movable unit 103, particularly if the movable unit 103 comprises an energy storage device as described above. If the energy storage of the movable unit 103 comprises an accumulator, provision may be made for selectively discharging the accumulator in order to extend the lifetime of the accumulator by discharging the accumulator to the predetermined charge level in the event that a predetermined charge level is exceeded, e.g. 80% of the maximum charge.

It may further be provided that the movable unit 103 may be actively braked. In this case, the linear motor 107 acts as a generator. Kinetic energy of the movable unit 103 is fed back into an intermediate circuit of the linear motor 107. A DC link voltage increases. To prevent the DC link voltage from becoming too high, provision may be made to convert this energy into heat in an upstream braking resistor. However, as an alternative to the braking resistor, energy transfer from the energy-transmitting coil 125 to the energy-receiving coil 127 may also be activated in an advantageous manner in order to charge the energy storage of the movable unit 103, even if this energy is not required at the moment. Thus, the efficiency may be increased since the energy generated by the braking process is not converted into heat, but is transferred to an energy storage on the movable unit 103.

Figure 4:
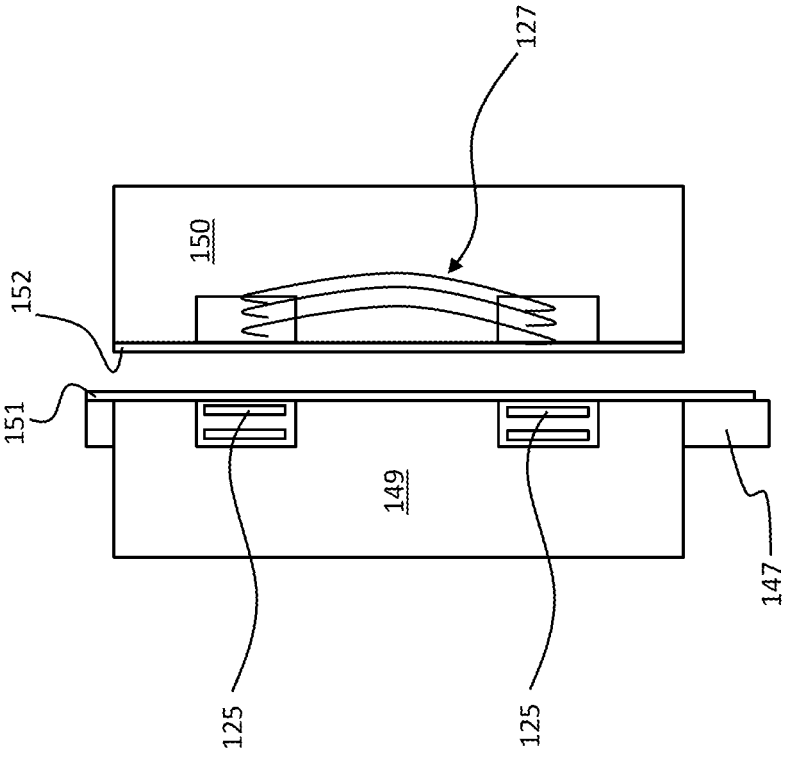
FIG. 4 shows a first example of a pair of coils for energy transfer.

FIG. 4 shows a first pair of coils comprising an energy-transmitting coil 125 and an energy-receiving coil 127. The energy-transmitting coil 125 is arranged as a so-called board coil on a board 147. Thereby, the circuit board 147 has recesses in which a ferromagnetic molded part 149 is arranged. The energy-receiving coil 127 comprises a plurality of windings of a wire around another ferromagnetic molded part 150. In this embodiment example, the energy-receiving coil 127 is wound longitudinally with respect to a traveling direction. As a result, a structure of the energy-receiving coil 127 is longer in the direction of travel but narrower transversely to the direction of travel. In addition, a finished wound air coil may be more easily placed on the further ferromagnetic molded part 150, allowing for less expensive manufacturing. Furthermore, an optional foil 151 and an optional further foil 152 are shown in FIG. 4, wherein the foil 151 covers the energy-transmitting coil 125 and the further foil 152 covers the energy-receiving coil 127, thereby e.g. allowing for a simple hygienic design in which the energy-transmitting coil 125 and the energy-receiving coil 127 are not exposed. The foil 151 or the further foil 152 may e.g. be a thin stainless steel foil, a plastic foil, e.g. made of Teflon, or a lacquer layer.

Figure 5:
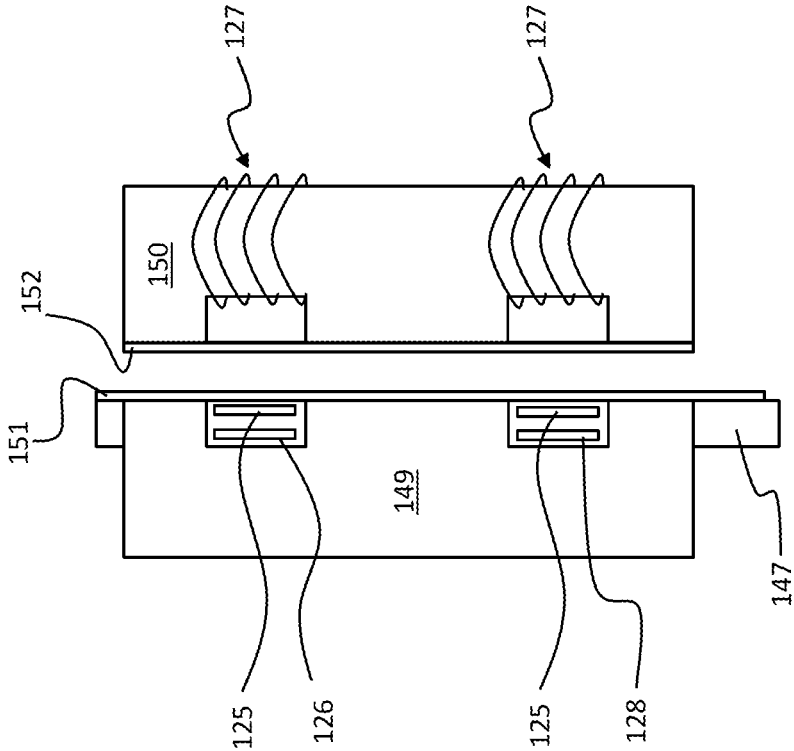
FIG. 5 shows a second pair of coils for energy transfer.

FIG. 5 shows a second pair of coils comprising an energy-transmitting coil 125 and an energy-receiving coil 127. The energy-transmitting coil 125 is constructed identically to FIG. 4, but in the case of the energy-receiving coil 127 the windings are arranged differently on the further ferromagnetic molded part 150. In this embodiment, the energy-receiving coil 127 is wound transversely to a direction of travel. This allows a plurality of movable units 103 to travel one behind the other with a shorter distance in the direction of travel. This is important in many applications.

In FIG. 5, the energy-receiving coil 127 comprising a first coil portion 126 and a second coil portion 128 is shown. This is an optional embodiment; only one energy-receiving coil 127 may be provided, as well. It may be provided that the first coil portion 126 is always connected and is used to supply power to an electronic system of the movable unit 103, while the second coil portion is only connected at certain times and the energy transmitted via the second coil portion 128 is used to operate the tool 137. This makes it possible to minimize energy losses.

Figure 6:
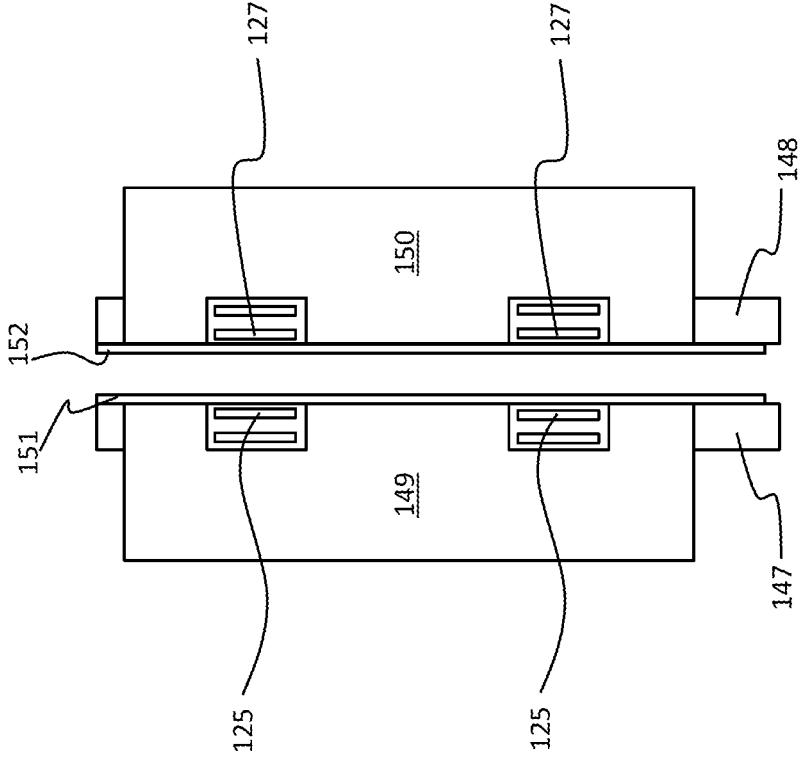
FIG. 6 shows a third pair of coils for energy transfer.

FIG. 6 shows a third coil arrangement, also comprising an energy-transmitting coil 125 and an energy-receiving coil 127. The energy-transmitting coil 125 is embodied as shown in FIGS. 4 and 5. The energy-receiving coil 127 is also arranged as a board coil on a further circuit board 148, the further circuit board 148 also having recesses in which the further ferromagnetic molded part 150 is arranged. This embodiment is very advantageous from a manufacturing point of view, since further electronic components may be contacted directly on the further printed circuit board 148 and only the further ferromagnetic molded part 150 has to be used.

Figure 7:
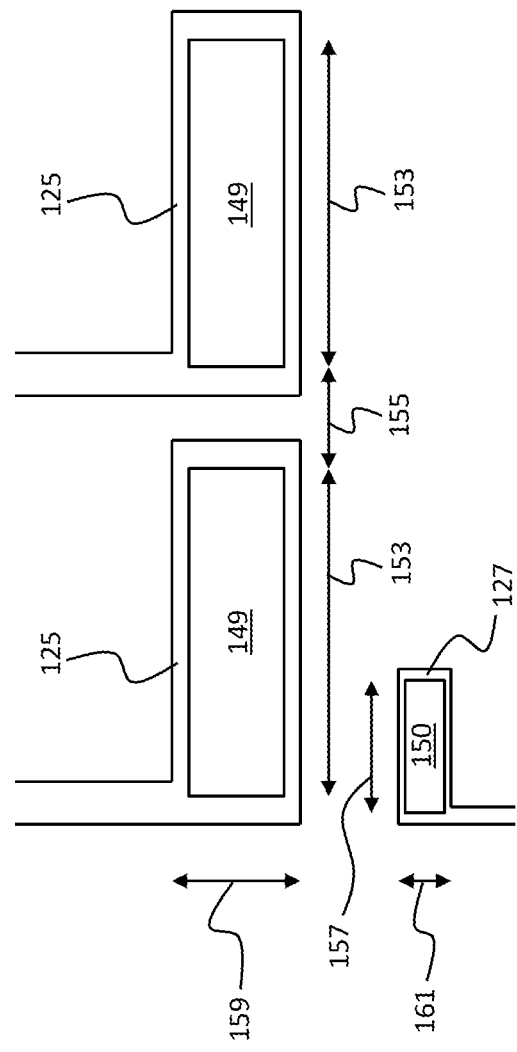
FIG. 7 shows a coil arrangement.

FIG. 7 shows a further schematic depiction of a coil arrangement consisting of two energy-transmitting coils 125 with a ferromagnetic molded part 149 arranged in each case within the energy-transmitting coils 125 and an energy-receiving coil 127, which likewise has a further ferromagnetic molded part 150 in the coil center. For simplicity of illustration, only the portions of the ferromagnetic molded part 149 located within the energy-transmitting coils 125 and the portions of the further ferromagnetic molded part 150 located within the energy-receiving coil 125 are shown. The energy-transmitting coils 125 and the energy-receiving coil 127 are thereby shown one below the other in FIG. 7, but this is only for schematic clarity. The energy-receiving coil 127 may be arranged in front of the energy-transmitting coils 125 in such a way that the ferromagnetic molded part 149 and the further ferromagnetic molded part 150 overlap, i.e. in analogy to FIGS. 4 to 6. The energy-transmitting coils 125 have a first dimension 153. The first dimension 153 corresponds to a dimension of the ferromagnetic molded part 149. A second dimension 155 is defined between the two ferromagnetic molded parts 149 of the energy-transmitting coils 125. Thus, the second dimension 155 indicates the distance between the two ferromagnetic molded parts 149. A third dimension 157 is a dimension of the further ferromagnetic molded part 150 of the energy-receiving coil 127.

In this context, the energy-transmitting coils 125 comprise a fourth dimension 159 corresponding to a height of the ferromagnetic shaped portion 149. The energy-receiving coil 127 comprises a fifth dimension 161 corresponding to a height of the further ferromagnetic shaped portion 150 of the energy-receiving coil 127. It may be provided that the fourth dimension 159 and the fifth dimension 161 are identical. The definitions of the first to fifth dimensions 153, 155, 157, 159, 161 thereby result from the fact that a magnetic flux is substantially focused by the ferromagnetic molded part 149 and the further ferromagnetic molded part 150, respectively. This results in a magnetic gap corresponding to the second dimension 155 between the energy-transmitting coil 125 and the energy-receiving coil 127.

Now, if the energy-receiving coil 127 is moved along the energy-transmitting coils 125, the energy-receiving coil 127 will move from one of the energy-transmitting coils 125 to the other of the energy-transmitting coils 125. It is irrelevant in this context whether this movement occurs within a stationary unit 111 and the energy-transmitting coils 125 are part of a stationary unit, or whether this transition is caused by the transition between two stationary units 111. It may be provided that in the case in which the position data indicates that the amount of energy is to be transmitted by a plurality of energy-transmitting coils 125, in FIG. 7 the two energy-transmitting coils 125 shown, the energy quantity information is adjusted based on an area of an intermediate space between the energy-transmitting coils 125 and an area of the energy-receiving coil 127. In the area defined by the second dimension 155, due to the fact that there is no ferromagnetic molded part 149 disposed there, the energy transmission is reduced. For this reason, when the energy-receiving coil 127 is located in this region, it makes sense to adjust the energy transmitted by the energy-transmitting coils 125. In this context, the adjustment may be made based on an area of the energy-receiving coil 127 and an area of an intermediate space, wherein the area of the energy-receiving coil 127 is a product of the third dimension 157 and of the fifth dimension 161, and the area of the intermediate space is a product of the second dimension 155 and the fourth dimension 159. If the fourth dimension 159 is equal to the fifth dimension 161, the amount of energy may also be adjusted simply by comparing the second dimension 155 and the third dimension 157. For example, if the product of the second dimension 155 and the fourth dimension 159 is 10% of the product of the third dimension 157 and the fifth dimension 161, the energy transmitted through the energy-transmitting coils 125 may be increased by 10%. In this context, the increase in energy may be accomplished by energizing the energy-transmitting coil 127 with an alternating current having a higher frequency and/or amplitude so that while the movable unit 103 is moved across the intermediate space between the energy-transmitting coils 125, a constant amount of energy or power is transmitted. Due to non-linear marginal effects, it may particularly also be the case that a simple consideration of a geometrical overlap of energy-receiving coil 127 and intermediate space is not sufficient. In this case, however, a functional relationship would be known and the current could be changed according to a previously determined function in order to transmit a constant power or energy.

It may be provided that the third dimension 157 is larger than the second dimension 155. In a further embodiment, it may be provided that the third dimension 157 is larger than a sum of the first dimension 153 and the second dimension 155. In yet another embodiment, it may be provided that the first dimension 153 is larger than the third dimension 157, which in turn is larger than the second dimension 155. With each of these embodiments, continuous energy transfer from the energy-transmitting coils 125 to the energy-receiving coil 127 may be achieved even as the energy-receiving coil 127 moves from one energy-transmitting coil 125 to another energy-transmitting coil 125 in the linear transport system 101. In this context, it may be provided that energizing of the two depicted energy-transmitting coils 125 is synchronized in such a way that the magnetic fields generated by the energization are in phase. As a result, the magnetic flux generated in the further molded part 150 may be added in an advantageous manner. This results in a more uniform power transfer in the transition.

Figure 8:
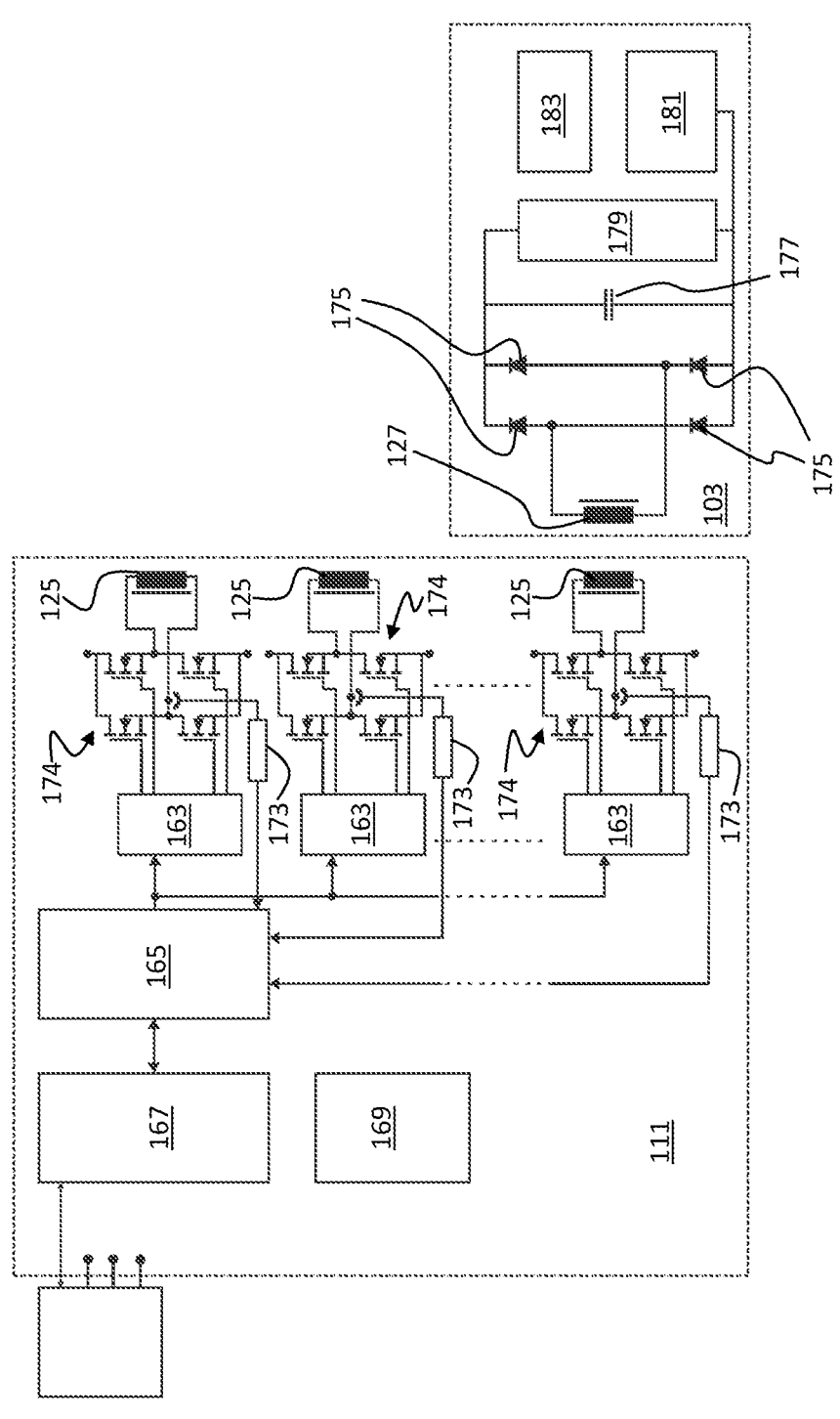
FIG. 8 shows an electrical circuit diagram of a stationary unit and of a movable unit.

FIG. 8 shows an electrical circuit diagram of a stationary unit 111 and a movable unit 103. The stationary unit 111 comprises a plurality of energy-transmitting coils 125. The energy-transmitting coils are driven by MOSFETs 174, and the MOSFETs 174 may be driven by a driver 163. The drivers 163 may thereby receive signals from a microcontroller 165. The microcontroller 165 may be connected to further stationary units 111 and/or the controller 133 via a communication interface 167. The connection may also be a multi-core communication interface, such as an SPI serial interface. Other power semiconductors, such as transistors or IGBTs, may be used instead of MOSFETs 174. Furthermore, the stationary unit 111 comprises a power supply 169. The drivers 163 are each connected to the energy-transmitting coils 125 via MOSFETs 174. Based on the position data, one of the energy-transmitting coils 125, namely the energy-transmitting coil 125 facing the movable unit 103, may be selected. If current is now applied to this energy-transmitting coil 125, the current induces a corresponding voltage in the energy-receiving coil 127 of the movable unit 103 via its magnetic field and a magnetic coupling, which voltage may be smoothed by diodes 175 and a capacitor 177, and is then available as a movable voltage supply 179 for a tool 137 of the movable unit 103. In this regard, the tool 137 may be connected by a connection element 181. Further, a communication controller 183 may be provided to control a data transmission to the movable unit 103.

Also shown in FIG. 8 is a current meter 173 via which in each case the amount of energy output by the energy-transmitting coils 125 may be passed on to the microcontroller 165 as an actual energy quantity signal in the form of a current intensity, and then the amount of energy output via the energy-transmitting coil 125 is controlled by the actual energy quantity signal. In this context, this control may be carried out by the microcontroller 165. In an alternative embodiment, the actual energy quantity signal is forwarded to the controller 133 via the communication interface 167 and the regulation is performed by the controller 133. In this case, the controller 133 may change the control signal and in particular the energy quantity information within the control signal and in turn output this control signal to the stationary unit 111, wherein the energy-transmitting coil 125 is now operated based on this changed control signal. In either case, control may be carried out based on a target current intensity that is compared to the measured current intensity. Alternatively, a transmitted energy amount or a transmitted power may be determined from the measured current amount and controlled based on this.

The invention further comprises the controller 133 which is set up to carry out the described method and to output control signals corresponding to the method on the basis of the position data. In this context, it may further be provided that the controller 133 is arranged for control via the actual energy quantity signal. The controller 133 may also be arranged for a position-dependent future activation of the tool 137. In this case, a higher power transfer may also be specified in advance, e.g. as feedforward control. For example, the controller 133 may be aware that the tool 137 is to be operated at a predetermined distance. In this case, the control 133 may specify in advance that a higher power transfer is to take place at this distance. This provides an alternative to control via actual energy quantity signals. The present invention further comprises a computer program comprising program code which, when executed on a computer, causes the computer to carry out the method. Such a computer program may e.g. be stored within the controller 133. The invention further comprises a machine-readable storage medium comprising the computer program.

The invention also comprises a stationary unit 111 of the linear transport system 101, which comprises a stator 109 having one or a plurality of drive coils. Additionally, the stationary unit 111 comprises at least one energy-transmitting coil 125 and is configured to receive a control signal from the controller 133. The control signal includes identification information identifying at least one energy-transmitting coil 125 of the stationary unit 111, and energy quantity information including the amount of energy to be transmitted. The controller 133 is adapted to select one or a plurality of energy-transmitting coils 125 of the stationary unit 111 based on the identification information, and to set an energy transfer of the one or a plurality of energy-transmitting coils 125 based on the energy quantity information.

In an embodiment, the stationary unit 111 comprises a control system 173, which may be configured as a control loop, for example, and via which an actual energy quantity signal is evaluated and used to adjust the energy transfer.

In an embodiment, the stationary unit 111 also comprises a guide rail 105 for moving the movable unit 103 along the stationary unit 111.

The invention further comprises a linear transport system 101 comprising a controller 133 configured as described above, at least one stationary unit 111 configured as described above, and at least one movable unit 103 configured as described above. Thus, the linear transport system 101 may be composed of a plurality of stationary units 111, and it is also possible that the linear transport system 101 comprises a plurality of movable units 103, although only one movable unit 103 is shown in each of the figures.

The linear transport system 101 may e.g. be applied in automation technology. The tool 137 arranged on the movable unit 103 may e.g. comprise a gripper, a pusher, a drill, an alignment device, a mechanical or magnetic coupling of a plurality of movable units 103, a measuring tool for measuring a physical quantity such as, for example, temperature, pressure, current, voltage, acceleration, mass, light incidence. Further, the tool 137 may comprise a read head that may be used to read an encoder tape, thereby enabling a further determination of position. This further more accurate position may then also be used to improve control of the movable unit 103 and/or control of the linear motor 107. This principle may of course also be used with other physical quantities measured on the movable unit 103, e.g. accelerations or vibrations. Furthermore, physical quantities may be generated on the movable unit 103 by the tool 137. A force could be generated via a movement of the tool 137 of the movable unit 103, and with an adjustable current limit of the drive coil used, the force could also be controlled or adjusted. Furthermore, a vacuum could be generated. This would allow products to be picked up and released via a special suction cup in a manner that is particularly gentle on the product itself. Test voltages could be generated. Using such test voltages, it would also be possible to functionally test products consisting of complex electronic circuits.

Communication to a more complex product with a communication interface would also be possible. Other physical quantities for material testing may also be generated, e.g. ultrasound, or currents, or light. Communication may also be established to a workpiece transported by the movable unit 103, and thus testing or other production monitoring may take place, e.g. seamless product tracking, if these data are linked to further data in the controller 133 and e.g. written to a database. Advantageously, data may thus be written to or read from a workpiece.

Furthermore, a heater could be provided to generate a higher temperature in a targeted manner and limited to a small area in order to dry an adhesive or paint faster and more energy-efficiently during a process, for example. Thereby, it may be provided to keep a workpiece or a product on the movable unit 103 at a specific temperature, e.g. in order to be able to process the workpiece or product for longer. In this case, e.g. data transmission may be dispensed with and energy may be transmitted by the associated energy-transmitting coil only in the areas in which heating is to be carried out. This transmitted energy is then used on the movable unit for heating, e.g. by connecting the energy-receiving coil directly to a heating element and thus automatically heating when energy is transmitted. With a switchable magnetic field source (coil), magnetic parts may be easily fixed, transported, and set down. Furthermore, the movable unit 103 may comprise a camera or other sensors to inspect the linear transport system 101 for wear, dirt, or otherwise. This is particularly useful when the linear transport system 101 has locations that are difficult or impossible to access.

Movements of any kind may be carried out on the movable unit 103, e.g. transverse to the direction of travel defined by the guide rail 105. A gripper may grip products and release them without the need for a mechanical link with springs. It may be provided that, depending on the status of the product, it be deposited on a different belt and thus sorted out, for example. The tool 137 may comprise a pusher to selectively push products from a movable unit 103 e.g. onto a belt. Via the pusher or a similarly movable element on the movable unit 103, a product flow that is handled by a linear transport system 101 may be distributed to various further transport systems, such as belts. Thus, with only one linear transport system 101 without a switch (with the aid of which the movable units 103 could be guided in different directions), it is possible to divide a fast product flow according to demand and also to join it again in the opposite direction.

Movements may be carried out by the tool 137 by which the product may be manipulated, e.g. in order to erect a carton or to process products. Drills may be used or pressure may be applied to the product by a press. Furthermore, rotary motion may be carried out to change an orientation of products from longitudinal to transverse, e.g. by rotating a workpiece holder. Products may be lifted. Products may be rotated and thus e.g. a lid of a bottle may be screwed down. Products may also be changed in their distance with regard to one another. An actuator on the movable unit 103 may be used to move a product so that product misalignments on an empty movable unit 103 may be compensated for. Thus, in a row of movable units 103 with a product defect in the row, the products on the units to the left of it may be moved half the distance to the right and vice versa on the other side, so that the products may be removed from a following machine unit for further processing without a defect in between with an equal distance to one another.

Products such as bottles may be precisely aligned if e.g. a label, printing or other component such as a drinking straw is to be applied to a bottle. Movements may be superimposed. Various hardware may be integrated into the tool 137 of the movable unit 103, and may be controlled via set values, e.g. also via PWM signals (solenoid valves, DC motor, stepper, small servo, VoiceCoil motor, vibration elements, electromagnets, vacuum, laser, ultrasonic source). Via HW limit switches or travels against a stop, absolute positioning may also be achieved without feedback, e.g. with a DC motor. Products could be measured via grippers or other mechanics and a measurement of the current consumption in the movement (also a condition monitoring of components of the moving unit 103 as well as product components becomes possible). Products may be sorted and e.g. handed over between moving units 103 and storage stations.

Movable units 103 may be coupled and uncoupled as needed to increase drive force, e.g. by hooking a mechanically moving part of one movable unit 103 into the other movable unit 103 or via an electromagnetic coupling. When synchronized with products moving on a belt, space may be saved between the movable units 103 if the tool 137 is movable perpendicularly to the direction of travel specified by the guide rail 105. This allows the tool 137 to enter narrower product gaps and cope with smaller gaps, thereby increasing a machine output. Movable units 103 jointly transporting a product may form a mechanical safety coupling during transport, which ensures, even in the event of a fault (power failure, etc.) that the sensitive product is held and cannot fall off or the product itself is destroyed, e.g. by the movable units 103 spinning out differently. This is possible both when both movable units 103 are part of the same linear transport system 101 and when both movable units 103 are part of different linear transport systems 101.

An electrically operated tool change on the movable unit 103 is also possible. Tools/receptacles/holders may be intelligently adapted to a dimension of the product.

It may be provided to adjust the frequency and/or the amplitude of the energy quantity information according to the demand. In this context, the energy quantity information may be different for each movable unit 103. A position of the movable unit and the applicative task of the movable unit 103 at its position may be known to the controller 133, so that in areas where little (applicative) energy is required e.g. for certain actions on the movable unit 103, a primary coil current of the energy transmission coil 125 may be adjusted in frequency, amplitude, but also signal form (e.g. sine or triangle), so that less (or more) energy may be transmitted. In an advantageous manner, the movable unit 103 may also transmit information on an energy state of the movable unit 103 by a data communication taking place via the stationary antenna 129 and movable antenna 131, so that the primary coil current may be adjusted accordingly in an optimal way and overall as loss-free as possible or controlled via the communication feedback. Thus, it may e.g. be prevented that in case of a (constantly set) too high energy transmission no superfluous energy on the movable unit 103 has to be consumed and, e.g. converted into dissipated heat, in particular at positions or in situations in which not so much energy is required on the movable unit 103. Another possibility of such energy control is to open and close the energy-receiving coil 127 via an electronic circuit. This may e.g. also be used to turn the tool 137 on or off. Furthermore, there may be loads on the movable unit 103 that may dissipate too much transferred energy when too much energy is transferred to the movable unit 103, e.g. due to variations in the air gap or different coil overlaps, so that overvoltages cannot occur on the movable unit 103. Such loads may e.g. be varistors or power resistors with appropriate electronic circuitry.

All of the above applications may require both energy transmission according to the invention and data transmission between the stationary unit 111 and the movable unit 103.

TABLE 1

List of reference numerals

| 101 | Transport system |
|---|---|
| 103 | Mobile unit |
| 105 | Guide rail |
| 107 | Linear motor |
| 109 | Stator |
| 111 | Stationary unit |
| 113 | Rotor |
| 117 | Magnet |
| 125 | Energy-transmitting coil |
| 126 | First coil portion |
| 127 | Energy-receiving coil |
| 128 | Second coil portion |
| 129 | Stationary antenna |
| 131 | Movable antenna |
| 133 | Controller |
| 135 | Drive coil |
| 137 | Tool |
| 139 | Roller |
| 141 | Track surface |
| 143 | Position-detecting element |
| 145 | Position sensor |
| 147 | Board |
| 148 | Further board |
| 149 | Ferromagnetic molded part |
| 150 | Further ferromagnetic molded part |
| 151 | Foil |
| 152 | Further foil |
| 153 | First dimension |
| 155 | Second dimension |
| 157 | Third dimension |
| 159 | Fourth dimension |
| 161 | Fifth dimension |
| 163 | Driver |
| 165 | Microcontroller |
| 167 | Communication interface |

TABLE 1-continued

List of reference numerals

| 169 | Power supply |
|---|---|
| 173 | Current meter |
| 174 | MOSFET |
| 175 | Diodes |
| 177 | Capacitor |
| 179 | Mobile power supply |
| 181 | Connecting element |
| 183 | Communication controller |

The invention claimed is:

1. A method for transferring energy from a stationary unit of a linear transport system to a movable unit of the linear transport system, wherein the linear transport system comprises:

a guide rail for guiding the movable unit, a plurality of stationary units, and a linear motor for driving the movable unit along the guide rail, wherein the linear motor comprises a stator and a rotor, wherein the stator comprises the stationary units, each comprising one or a plurality of drive coils, wherein the rotor is arranged on the movable unit and comprises one or a plurality of magnets, wherein the stationary units each comprise one or a plurality of energy-transmitting coils, wherein the movable unit comprises at least one energy-receiving coil, and wherein the linear transport system comprises a controller; and wherein the following steps are carried out by the controller:

determining position data of the energy-receiving coil of the movable unit;

selecting at least one of the energy-transmitting coils within the linear transport system based on the position data of the energy-receiving coil; and outputting a control signal to the stationary unit comprising the at least one energy-transmitting coil, comprising identification information by which the at least one energy-transmitting coil is identifiable.

2. The method of claim 1, wherein the control signal comprises energy quantity information, wherein the energy quantity information comprises an energy amount to be transmitted.

3. The method of claim 2, wherein in the case that the position data indicate that the energy amount is to be transmitted by a plurality of energy-transmitting coils, the plurality of energy-transmitting coils being arranged along the guide rail, the energy quantity information is adjusted based on an area of an intermediate space between the energy-transmitting coils and an area of the energy-receiving coil.

4. The method of claim 3, wherein phase information is output, wherein the plurality of energy-transmitting coils are energized in phase.

5. The method of claim 3, wherein the energy quantity is increased.

6. The method of claim 2, wherein the energy quantity information comprises an amplitude and/or a frequency of an AC voltage or current.

7. The method of claim 2, wherein the energy amount comprises a load energy quantity at a first point in time and an idle energy quantity at a second point in time, wherein the load energy quantity is sufficient to operate a tool arranged on the movable unit, wherein the idle energy quantity is at most sufficient to maintain a power supply to a communication unit of the movable unit.

8. The method of claim 7, wherein the idle energy quantity is zero.

9. The method according to claim 1, wherein the position data are determined based on a measurement of at least one position sensor and/or are determined based on a current supply to the linear motor.

10. The method of claim 1, wherein an actual energy quantity signal of the movable unit is evaluated and the energy quantity is controlled based on the actual energy quantity signal.

11. A controller configured to carry out the method of claim 1.

12. A linear transport system comprising a controller according to claim 11, and a stationary unit of the linear transport system,
    wherein the stationary unit comprises a stator having one or a plurality of drive coils for driving a rotor,
    wherein the stationary unit comprises at least one energy-transmitting coil,
    wherein the stationary unit is configured to:
        receive the control signal comprising the identification information by which the at least one energy-transmitting coil is identifiable, and energy quantity information comprising an amount of energy to be transferred,
        select the at least one or a plurality of the energy-transmitting coils of the stationary unit based on the identification information, and
        adjust an energy transfer of the at least one or plurality of energy-transmitting coils based on the energy quantity information,
    wherein the linear transport system further comprises a movable unit,
    wherein the movable unit comprises an energy-receiving coil,
    wherein a rotor is arranged on the movable unit and comprises one or a plurality of magnets, and
    wherein the stator and the rotor are configured as a linear drive.

13. A computer system comprising a computer processor and a non-transitory machine-readable data storage medium having program code stored thereon which, when executed on the computer processor, causes the computer processor to perform the method of claim 1.

14. A non-transitory machine-readable data storage medium having computer program code stored thereon, and executable on a computer processor system to perform the method of claim 1.

15. A stationary unit of a linear transport system, wherein the stationary unit comprises:
    a stator having one or a plurality of drive coils for driving a rotor, and
    at least one energy-transmitting coil;
    wherein the stationary unit is configured to:

receive a control signal comprising identification information for identifying at least one of the energy-transmitting coils, and energy quantity information comprising an amount of energy to be transferred,
        select one or a plurality of the at least one energy-transmitting coils of the stationary unit based on the identification information, and
        adjust an energy transfer of the one or plurality of energy-transmitting coils based on the energy quantity information.

16. The stationary unit of claim 15, further comprising a control loop by which an actual energy quantity signal is evaluated and used to adjust the energy transfer.

17. The stationary unit of claim 15, further comprising a guide rail.

18. A method for transferring energy from a stationary unit of a linear transport system to a movable unit of the linear transport system,
    wherein the linear transport system comprises:
        a guide rail for guiding the movable unit,
        a plurality of stationary units, and
        a linear motor for driving the movable unit along the guide rail;
        wherein the linear motor comprises a stator and a rotor;
        wherein the stator comprises the stationary units, each comprising one or a plurality of drive coils,
        wherein the rotor is arranged on the movable unit and comprises one or a plurality of magnets,
        wherein the stationary units each comprise one or a plurality of energy-transmitting coils,
        wherein the movable unit comprises at least one energy-receiving coil, and
        wherein the linear transport system comprises a controller;
    wherein the following steps are carried out by the controller:
        determining position data of the energy-receiving coil of the movable unit;
        selecting at least one energy-transmitting coil within the linear transport system based on position data from the energy-receiving coil; and
        outputting a control signal to the stationary unit comprising the at least one energy-transmitting coil;
        wherein the control signal comprises energy quantity information,
        wherein the energy quantity information comprises an energy amount to be transmitted, wherein the energy amount comprises a load energy quantity at a first point in time and an idle energy quantity at a second point in time,
        wherein the load energy quantity is sufficient to operate a tool arranged on the movable unit, and
        wherein the idle energy quantity is sufficient to maintain a power supply to a communication unit of the movable unit.

* * * * *